United States Patent [19]

Schmanski

[11] 4,055,697
[45] Oct. 25, 1977

[54] WOVEN MATERIAL WITH FILLING THREADS AT ANGLES OTHER THAN RIGHT ANGLES

[75] Inventor: Donald W. Schmanski, Carson City, Nev.

[73] Assignee: Fiberite Corporation, Winona, Minn.

[21] Appl. No.: 578,372

[22] Filed: May 19, 1975

[51] Int. Cl.² .............................................. B32B 5/12
[52] U.S. Cl. .................................... 428/113; 26/51.3;
26/51.4; 26/97; 26/72; 26/75;
428/236; 428/246; 428/251; 428/253;
428/257; 428/366; 428/367; 428/408; 428/902

[58] Field of Search ............... 428/105, 107, 109, 111,
428/112, 113, 223, 236, 246, 251, 253, 257, 408,
336, 367, 902; 26/51.3, 51.4, 57 A, 57 E, 65, 66, 67

[56] References Cited

U.S. PATENT DOCUMENTS

| 2,985,941 | 5/1961 | Riedesel | 428/112 |
| 3,557,268 | 1/1971 | Beretta | 264/145 |
| 3,573,123 | 3/1971 | Siegel | 156/171 |

*Primary Examiner*—Marion E. McCamish
*Attorney, Agent, or Firm*—Richard J. Renk

[57] ABSTRACT

A woven material wherein the woof or cross filling threads are disposed at a predetermined angle other than a right angle to the warp or lengthwise threads.

16 Claims, 8 Drawing Figures

WOVEN MATERIAL WITH FILLING THREADS AT ANGLES OTHER THAN RIGHT ANGLES

BACKGROUND OF INVENTION

In the manufacture of structures using high-modulus reinforcements such as graphite (carbon), boron and the like, it has been common to orient fibers at right angles to each other to obtain desired non-anisotropic properties.

Often times in making such structures, a series of plies or laminates including woven materials of the conventional 90° cross-pattern weave are used to obtain the desired structural characteristics. Where it is required that some of the properties be developed at angles other than the 0° axis or 90° axis of the lengthwise and filling threads, the "90°" woven material is skewed or laminated on a bias. Structures using woven materials laminated on a bias not only do not produce the full physical properties of the individual fibers, but are also costly because of the material wasted in trimming the excess bias material.

SUMMARY OF INVENTION

The present invention overcomes the problems of the prior art by providing a material wherein the lengthwise threads (warp) and filling threads (woof) are disposed at a predetermined angle other than the conventional 90° relationship with respect to one another. Thus, one single ply can take the place of two plies, etc..

IN THE DRAWINGS

FIGS. 1(a) and 1(b) are plan views showing a conventional manner of constructing a composite material wherein the structure of FIG. 1(a) is superimposed and bonded to the structure of FIG. 1(b).

DESCRIPTION OF INVENTION

High modulus materials have become very attractive for use in aerospace, automotive, marine and sporting good applications because of their ultra-high strength and stiffness. Because of these characteristics, in some applications, weight savings of 30% can be achieved. For example, a typical graphite or carbon composite material has a density of one fifth that of steel and one half that of aluminum. These weight savings in aerospace and automotive uses can result in very substantial energy savings because of the resultant lower power requirements.

One approach to using high modulus fibers (or filaments) has been to orient the fibers in a matrix, usually a thermoplastic or thermosetting resin such as epoxy, polyester, polyimide or nylon. The fibers reinforce the matrix system to produce a strong, stiff structural material. Mechanical properties can be varied by adjusting the ratios of the fiber and resin used, the types of fibers used and the orientation of the fibers.

Figure 1A:
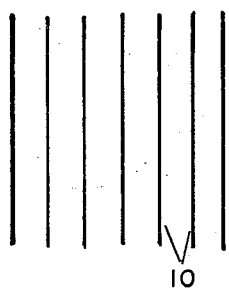
FIG. 1(c) is a representative sectional view taken along lines 1(c)—1(c) of FIG. 1(b).
Figure 1B:
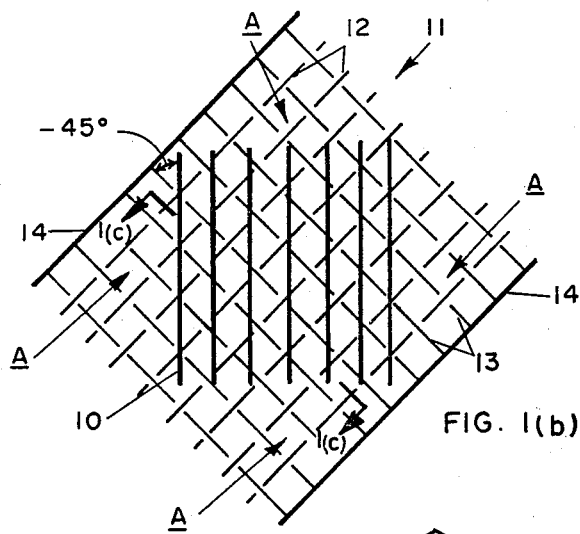

A typical prior practice in orienting fibers is shown in FIGS. 1(a) and 1(b). In this example it is desired to have longitudinal fibers 10, which extend along a 0° axis, combined with fibers which extend along a −45° axis. To provide such structure, the longitudinal fibers 10 of FIG. 1(a) are overlayed (or viz) on, and laminated to, a woven fabric material 11 of FIG. 1(b). Woven sheet 11 is of the typical weave with its lengthwise or longitudinal fibers or threads 12 (warp) being disposed at 90° with respect to the filling fibers or threads 13 (woof). The sheet is held together at its sides by the usual selvage edges 14.

In this prior practice, as will be seen from FIG. 1(b), in order to obtain fibers oriented in a −45° direction to the longitudinal fibers 10, it is necessary to skew or turn the sheet 11 so as to be on a bias with respect to the longitudinal fibers 10. The longitudinal fibers 10 are then bonded to the sheet 11 by a suitable resin matrix material (not shown) to form a composite.

However, there are inherent deficiencies in the prior practice as typified by FIGS. 1(a) and 1(b). Because the resin matrix (which has lower modulus properties than the fibers) is required to translate properties through an entire structure, the ultimate properties of the composite are generally lower than the individual properties of the fibers. For example, it is necessary to trim the composite to the size of the overlay defined by the array of fibers 10. The triangular pieces indicated at A are then trimmed thereby resulting in a loss of "yield" and increased costs.

Now, the present invention overcomes the deficiencies of the prior approaches by providing an oriented woven material wherein the threads or fibers are disposed in a predetermined angular relationship with respect to one another other than the conventional 90° weaving pattern. A typical example of one form of the invention is shown at 15 in FIG. 2 wherein the lengthwise or longitudinal fibers 16 (warp) are in a 0° axis orientation and the filling fibers 17 (woof) are shown at −45° to the 0° axis. The sides 18 of the woven fabric have a selvage edge which may be of the same fiber or another fiber such as Kevlar (Du Pont's tradename for aromatic nylon). The weave interlocking of the longitudinal fibers 16 and filling fibers 17 is shown in the cross-sectional view of FIG. 3.

Figure 2:
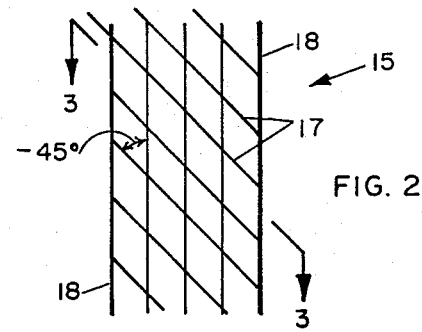
FIG. 2 is a plan view showing one form the material of the invention may take.
Figure 3:
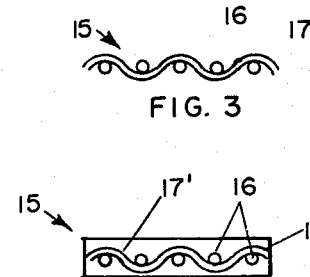
FIG. 3 is a sectional view of the material taken alone lines 3—3 of FIG. 2.
Figure 4:
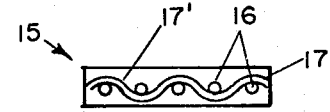
FIG. 4 is a sectional view similar to FIG. 3 wherein the material of the invention has a matrix binder applied to it.

Thus, it will be noted that the single woven layer 15 of FIGS. 2 and 3 permits the fibers to be laid down in their desired orientation in one operation instead of laminating as in FIGS. 1(a) and 1(b), i.e. in a single ply instead of multiple plies.

As a result, by being able to use a single play to achieve the results of a multiple ply, greater use can be made of the properties of the high modulus fibers since their combined strength isn't reduced by having a transmit their properties through the weaker laminating resin matrix. Higher design limits are therefore possible. Another very important advantage is achieved by the woven fabric of the invention since the interlocking of the weave as shown in FIG. 3 provides higher "rail-shear" than is possible with the laminate of FIG. 1(c). For example, as may be viewed in FIG. 1(c), when adjacent fibers 10 are subjected to opposing forces in the directions X and Y, the fibers shear apart much more easily than when the adjacent fibers are locked in by a weave pattern as in FIG. 3.

Figure 1C:
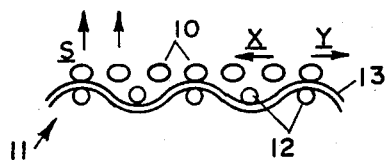

Another advantage is apparent when viewing FIG. 1(c). With forces applied to adjacent fibers 10 in the direction S, there is much more tendency to delaminate the fibers 10 from the woven base 11 than is the case of the interlock weave of the invention shown in FIG. 3. However, the material of the invention indicated at 15 in addition to the interlocking woven feature is able to take advantage of the predetermined angular orientation of the filling threads 17 with respect to the longitudinal threads 16.

Figure 6:
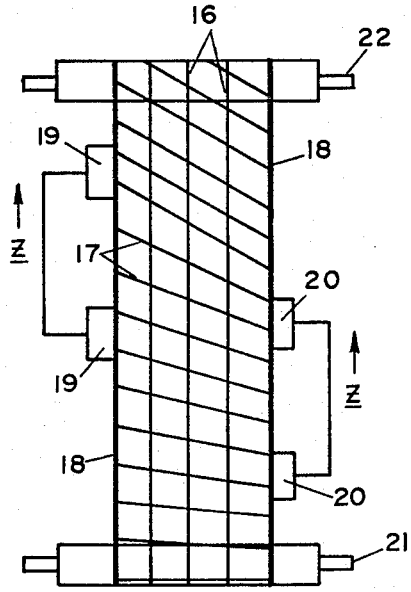
FIG. 6 is a schematic top view of the material of the invention showing one means of orienting the filling threads with respect to the lengthwise threads.

One possible means of making the material of FIG. 2 is shown in FIG. 6 wherein a tentering machine (well known in the textile machinery field) is used to orient the filling threads at the desired angle. In this case the machine is used for a purpose opposite of its intended design. Jaws 19 and 20 on opposed sides of a fabric grip the selvage edges 18 as the material is unrolled from a first roll 21 to a second roll 22. To impart the angular arrangement between the filling threads and the longitudinal threads, the grippers 19 move faster in the direction Z than the grippers 20 to provide the distorting effect in filling threads. The angular re-arrangement of the filling threads 17 relative to the longitudinal threads 16 can of course be varied by changing the relative speed between the grippers 19 and 20. Although not shown in the drawings, as the material is rolled onto roller 22, it may reduce slightly in width. Another possible method of making the material, such as on a loom, would be to orient the filling thread shuttle, (and/or the longitudinal thread frame) so as to weave the filling and longitudinal threads at an angle other than 90° with respect to one another.

Figure 5:
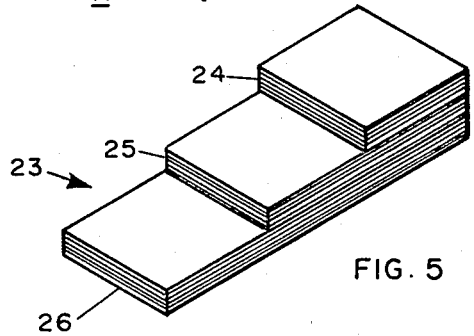
FIG. 5 is a partial sectional view of a composite using a series of plies or laminates of the material made according to the invention.

While the invention has been described in conjunction with the use of a single ply of the woven material as shown at 15 in FIG. 2, the fabric may also be laminated to other laminates and individual plies may also have other angular arrangements between the filling and longitudinal threads. As shown in FIG. 5, a series of laminates made in accordance with the concepts of FIG. 2, but perhaps with different angular orientation of the filling yarn might be used. For example, a composite 23 may have a series of layers such as a layer 24 with the filling threads at an angle of −45° with respect to the longitudinal, a layer 25 may have the filling threads at +60° and another layer 26 may have the filling threads at a −30° etc.. It is also possible for only one ply 15 of the invention to be used with non-woven materials.

In another form of the invention, where specific properties are required in different locations (such as with contoured parts), the filling threads in an individual ply of the material 15 may be disposed at different angles with respect to one another; in other words not parallel to one another. (Likewise, the lengthwise threads in a given ply may be disposed at different angles with respect to one another.) Of course, while the filling and lengthwise threads have been shown as individual single lines in the drawings, a series or group of filling threads could be included where one individual thread is shown.

Although the invention can be practiced with many types of fibers, it has particularly utility when used with fibers which are essentially generally non-extensible, such as graphite (carbon), glass, boron, silica, ceramic, etc.. While the term "thread" has been used frequently throughout the specification and claims, it can of course mean "filament" or "fiber" or a combined series of plies or strands of such materials.

What I claim is:

1. An anistropic material comprising,
    a plurality of lengthwise spaced threads,
    a plurality of filling threads interwoven with said lengthwise threads so as to place some areas of said filling threads on opposite sides of said lengthwise threads,
    a number of said filling threads being interwoven with said lengthwise threads along pre-oriented axes and at predetermined angles other than a right angle with respect to said lengthwise threads to impart physical characteristics to said material at angles other than at right angles thereto,
    said interwoven filling threads and said lengthwise threads interlocking one another to provide rail-shear strength and reduce lateral movement and delamination effects between said lengthwise and filling threads.

2. A woven material as claimed in claim 1 wherein at least some of said threads are of a high-modulus type.

3. A woven material as claimed in claim 1 wherein said material is substantially covered with a matrix binder.

4. A woven material as claimed in claim 1 wherein some of said threads are of a generally non-extensible type.

5. A woven material as claimed in claim 1 wherein at least some of said threads are of a graphite type.

6. A woven material as claimed in claim 1 wherein at least some of said filling threads are not parallel to one another.

7. A woven material as claimed in claim 1 wherein at least some of said lengthwise threads are not parallel to one another.

8. A woven material as claimed in claim 1 wherein at least some of said threads are of a boron type.

9. A woven material as claimed in claim 1 wherein at least some of said threads are of a glass fiber type.

10. A woven material as claimed in claim 1 wherein at least some of said threads are of a silica type.

11. A woven material as claimed in claim 1 wherein at least some of said threads are of a ceramic type.

12. An article having portions thereof which are disposed
    in an anistropic manner comprising,
    a first layer;
    said first layer including a plurality of filling threads interwaoven with a plurality of lengthwise threads so as to place some areas of said filling threads on opposite sides of said lengthwise threads,
    a number of said filling threads being interwoven with said lengthwise threads along pre-oriented axes and at a predetermined angle other than a right angle with respect to said lengthwise threads to impart physical characteristics to said material at angles other than at right angles,
    said interwoven filling threads and said lengthwise threads interlocking one another to provide rail-shear strength and reduce lateral movement and delamination effects between such lengthwise and filling threads, and
    a second layer,
    said second layer being operatively connected to said first layer in superimposed fashion to form an integral structure.

13. An article as claimed in claim 12 wherein said first layer has generally non-extensible threads therein.

14. An article as claimed in claim 12 wherein said article includes a number of layers similar to said first layer.

15. An article as claimed in claim 12 wherein there are a number of layets similar to said first layer and wherein the filling threads in at least one of said layers are disposed at an angle different from the filling threads of another layer of said article.

16. A layer material for use in superimposed relationship with respect to another material to provide predetermined structural properties comprising,
   a plurality of lengthwise spaced threads,
   a plurality of filling threads interwoven with said lengthwise threads so as to place some areas of said filling threads on opposite sides of said lengthwise threads,
   a number of said filling threads being interwoven with said lengthwise threads along pre-oriented axes and at predetermined angles other than a right angle with respect to said lengthwise threads to impart physical characteristics to said material at angles other than at right angles thereto,
   said interwoven filling threads and said lengthwise threads interlocking one another to provide rail-shear strength and reduce lateral movement and delamination effects between said lengthwise and filling threads when forces are applied in directions other than parallel to the orientation axes of said threads.

* * * * *